United States Patent [19]

Robbins, III

[11] Patent Number: 5,176,280
[45] Date of Patent: Jan. 5, 1993

[54] BASKET AND FRAME ASSEMBLY FOR SUPPORTING A THIN WALLED CONTAINER

[76] Inventor: Edward S. Robbins, III, 459 N. Court, Florence, Ala. 26360

[21] Appl. No.: 680,532

[22] Filed: Apr. 4, 1991

[51] Int. Cl.$^5$ .............................................. B65D 23/10
[52] U.S. Cl. .................................... 220/404; 220/741; 215/100 A; 294/31.2
[58] Field of Search .................... 215/12.1, 100 A; 220/85 H, 403, 94 R, 666, 741, 742, 743, 23.73; 294/27.1, 31.2, 32.33

[56] References Cited

U.S. PATENT DOCUMENTS

| | | | |
|---|---|---|---|
| D. 186,555 | 11/1959 | Hunt | D58/26 |
| D. 292,160 | 10/1987 | Thomas | D7/70 |
| 535,550 | 3/1895 | Müller | 215/11.6 |
| 704,972 | 7/1902 | Griffith | 215/12.1 |
| 770,528 | 9/1904 | Kestner | 215/12.1 |
| 965,629 | 7/1910 | Holz | 294/28 |
| 1,353,282 | 9/1920 | Shrauger | 294/32 X |
| 1,428,758 | 9/1922 | Cowles | 215/100 A X |
| 1,468,808 | 9/1923 | Hamilton | 215/12.1 |
| 1,702,555 | 2/1929 | Watson | 248/145.6 |
| 1,783,765 | 12/1930 | Anderssen | 215/100 A |
| 1,843,325 | 2/1932 | Kappelly | 215/12.1 |
| 2,088,387 | 7/1937 | Rice, Jr. et al. | 220/241 X |
| 2,755,838 | 7/1956 | Kennedy, Jr. | 220/94 R |
| 2,838,226 | 6/1958 | Hartmann et al. | 229/90 |
| 2,859,891 | 11/1958 | Carkin | 215/11.6 |
| 2,867,364 | 1/1959 | Bramante | 224/45 |
| 2,928,570 | 3/1960 | Fitch | 220/85 |
| 3,061,129 | 10/1962 | Fitzgerald | 215/11.6 |
| 3,092,277 | 6/1963 | Brim | 215/13.1 |
| 3,194,461 | 7/1965 | Tupper | 220/94 R X |
| 3,202,309 | 8/1965 | Simpson | 215/100 A |
| 3,246,451 | 9/1973 | Popeil | 220/96 |
| 3,255,932 | 6/1966 | Hunter et al. | 222/183 |
| 3,402,843 | 9/1968 | Campbell | 215/100 |
| 3,606,962 | 9/1971 | Scholle | 222/105 |
| 3,610,671 | 10/1971 | Conger | 215/100 A |
| 3,688,936 | 9/1972 | Killigrew, Jr. | 215/100 A |
| 4,300,612 | 11/1981 | Schroeder, Jr. et al. | 150/52 |
| 4,379,578 | 4/1983 | Schuler | 294/31.2 |
| 4,486,043 | 12/1984 | Rais | 294/27 H |
| 4,511,167 | 4/1985 | Kawaguchi | 294/28 |
| 4,552,396 | 11/1985 | Rais | 294/27.1 |
| 4,653,671 | 3/1987 | Duffy et al. | 222/105 |
| 4,660,876 | 4/1987 | Weldin et al. | 294/33 |
| 4,666,197 | 5/1987 | Watson et al. | 294/31.2 |
| 4,667,359 | 5/1987 | Polotti | 294/31.2 X |
| 4,671,427 | 6/1987 | Farquharson | 222/83.5 |
| 4,842,158 | 6/1989 | Reyes, Jr. | 215/100 A X |
| 4,896,913 | 1/1990 | Kennedy | 294/33 X |
| 4,972,964 | 11/1990 | Escalante | 215/100 R X |
| 5,025,490 | 6/1991 | Akly | 215/100 A |

FOREIGN PATENT DOCUMENTS

| | | | |
|---|---|---|---|
| 528034 | 1/1957 | Belgium | 215/12.1 |
| 438943 | 5/1912 | France | 215/12.1 |
| 442797 | 11/1948 | Italy | 215/100 A |
| 911277 | 11/1962 | United Kingdom | 294/31.2 |
| 964764 | 7/1964 | United Kingdom | 215/100 A |

*Primary Examiner*—Sue A. Weaver
*Attorney, Agent, or Firm*—Nixon & Vanderhye

[57] ABSTRACT

A basket and frame assembly for supporting a flexible container includes a basket component having a peripheral side wall and a bottom wall; and a closed-loop frame component which includes a container neck engaging portion, a pair of side wall portions and a bottom portion. The basket component seats within the frame component such that the side wall portions of the frame component are received within diametrically opposed grooves provided in the basket component, with the bottom portion of the frame component extending across and in engagement with the bottom wall of the basket component.

29 Claims, 5 Drawing Sheets

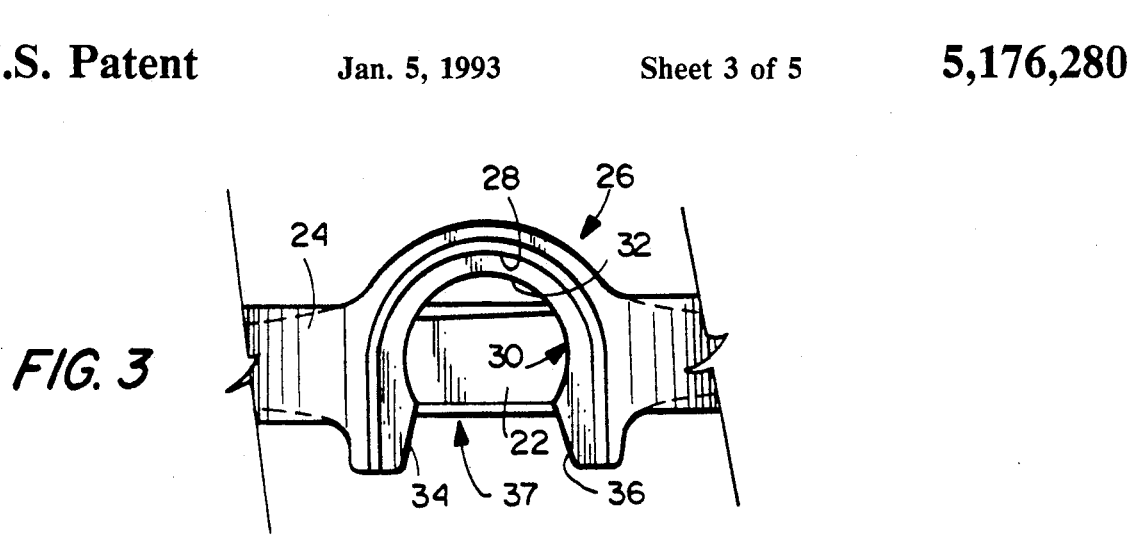
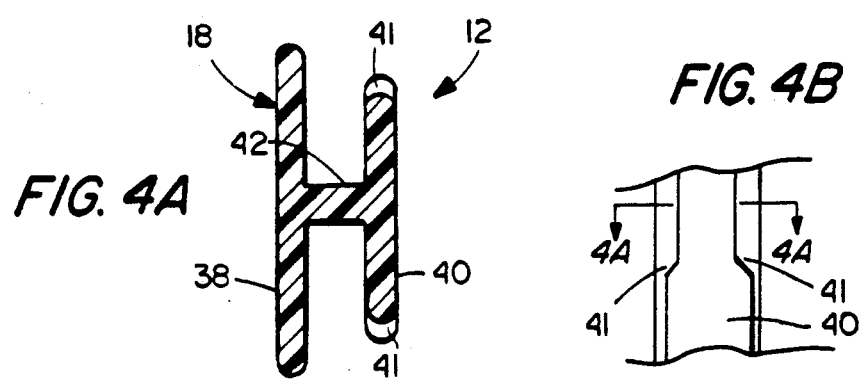
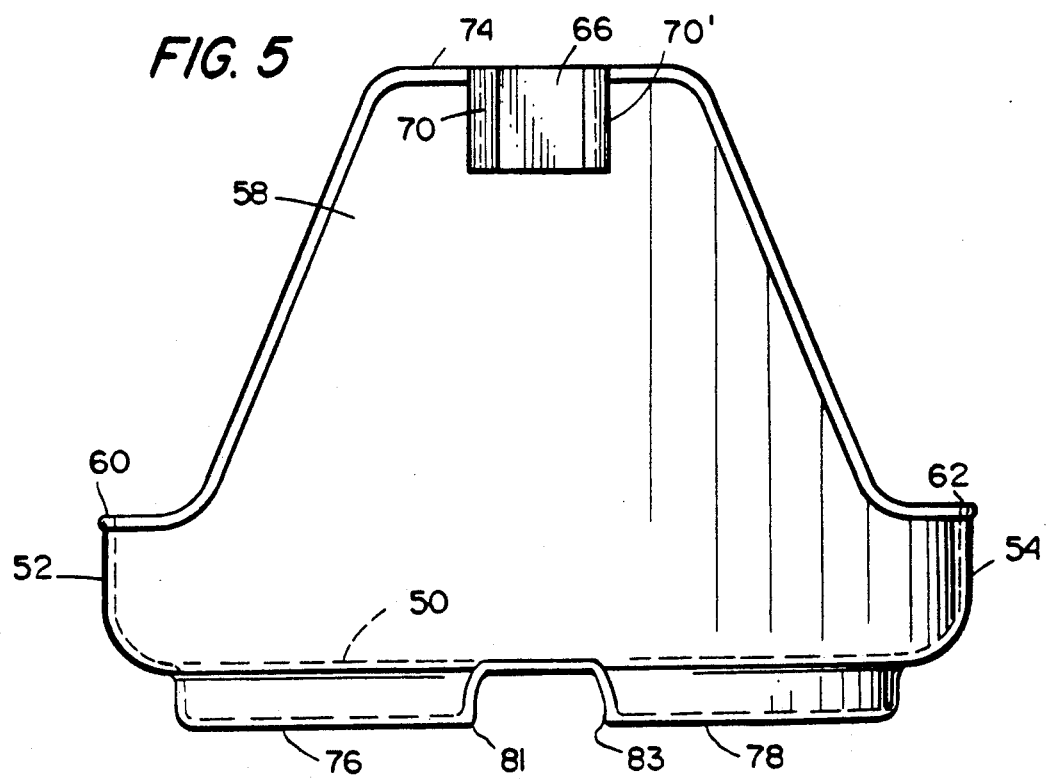

BASKET AND FRAME ASSEMBLY FOR SUPPORTING A THIN WALLED CONTAINER

FIELD OF THE INVENTION

This invention generally relates to thin walled, flexible and collapsible containers and associated carriers for such containers, which are useful for holding various materials, including liquid foodstuffs, (milk, water, juice, etc.), other non-foodstuff liquids (dish and laundry detergent, etc.), viscous liquids and non-liquid flowable material (powders, granules, salts, etc.). More specifically, the present invention relates to a relatively rigid reusable container carrier including basket and frame components useable together and adapted to receive and hold a flexible, collapsible, thin walled container in a temporarily fixed relationship, and which enables the consumer to conveniently use and then dispose of an empty container, and replace it with a similar, filled (or "refill") container.

BACKGROUND AND SUMMARY OF THE INVENTION

There is great concern in government and in the food packaging industry for potential environmental hazards associated with disposable plastic containers used in the packaging and sale of beverages such as milk, water, juice, etc., other liquids or semi-liquids (viscous fluids) such as detergents, ketchup, etc., as well as flowable non-liquids such as powders, granules, and salts, etc. It has been estimated, for example, that in the dairy industry alone, as much as 500 million pounds of plastic are required each year for consumer oriented containers, virtually all of which eventually find their way to landfills and/or other waste sites. Significant amounts of scrap plastic are also produced by the manufacture of such large amounts of plastic, thereby also contributing to the waste problem. The thin walled container assemblies of my above identified parent application alleviate this problem to the extent of reducing the plastic required to form, for example, a one-gallon container by about fifty percent.

In order to fully utilize the advantages of the thin walled, flexible and disposable containers such as those described in my co-pending application Ser. Nos. 07/432, U.S. Pat. No. 07/576,080 filed Aug. 31, 1990, it is desirable to provide a carrier which will securely hold a thin walled container during use, and particularly during pouring. In other words, while the thin walled containers disclosed in my copending applications are sufficiently strong as to be sold (and used) separately as replacements or refills on the shelf with no supporting carrier, the use of the container and particularly the pouring of contents therefrom is made easier and less prone to spilling, because the user need not directly grasp the flexible sidewall of the container.

Suitable carriers for thin walled, flexible, collapsible containers are also disclosed in my above identified co-pending application Ser. Nos. 07/432,672 and 07/576,080; as well as in my prior U.S. Pat. Nos. 4,982,868 and 4,982,869.

The present invention provides yet other easy to use, low cost, reusable carriers for thin walled or other containers.

In one exemplary embodiment, the present invention provides a carrier which includes cooperable frame and basket components, preferably but not necessarily made of plastic material. Specifically, a unitary frame member is provided which includes a container neck engaging portion at an upper end, with integrally formed side portions which extend downwardly away from the container neck engaging portion, and a bottom wall portion which connects the side portions. In other words, the frame is in the form of a closed, relatively rigid loop which substantially completely encircles or surrounds the container in a substantially vertical plane.

The frame component itself has a cross section similar to that of an I-beam, which is particularly advantageous in that it not only rigidifies the frame member, but also provides a convenient surface configuration for supporting the basket component as further described below.

The basket portion of the carrier assembly is a one-piece, cup-like construction, and includes a peripheral side wall, an open top and a closed bottom wall. The side wall is formed with two relatively short and diametrically opposed portions, and two relatively tall diametrically opposed portions. This arrangement conserves material and lowers the cost of the assembly. The lower portions facilitate assembly or introduction of the container into the basket, while the taller or upstanding portions provide greater peripheral support for the container. In this exemplary embodiment, in the upstanding portions there are also formed diametrically opposed ears having outwardly facing grooves adapted to receive one of the two flanges of the I-beam like cross section of the frame member. In other words, the diametrically opposed ears are provided with grooves which enable the basket to slide along the side portions of the frame, and to be removably secured to the frame.

The bottom wall portion of the basket is provided with arcuate, diametrically opposed support legs which project downwardly from the bottom wall and which extend about 160° on either side of a center line of the bottom wall, thereby leaving a recessed center portion which enables the basket to seat on the frame bottom portion member with the supporting legs adapted to engage a supporting surface such as a table or the like. This arrangement permits the frame member to be seated in the recessed area and flush with or slightly offset upwardly from the supporting leg portions so as not to interfere with the stability of the assembly afforded by the support legs.

In another exemplary embodiment, vertical grooves are formed along the length of the upstanding portions of the peripheral side wall of the basket component. The frame component is sized so that the side portions snap into place within the diametrically opposed grooves. The vertical grooves may be formed continuously with a groove extending across the bottom wall of the basket component so that the frame component (when in place) is fully seated in a continuous generally U-shaped groove extending across the bottom of the basket and along diametrically opposed portions of the side wall.

In still another exemplary embodiment, one upstanding peripheral portion is considerably taller than the other, thereby further facilitating insertion of a container within the assembly.

Since (in all embodiments) the basket is supported within the frame at the two diametrically opposed, upstanding portions of the basket as well as along the bottom wall of the basket, when a container is in place in the basket with its neck portion frictionally engaged by the neck support portion of the frame, an overall relatively rigid assembly is provided which facilitates easy pouring of the contents of the container without danger of any relative slipping movement between any of the frame, basket and container.

It will be appreciated that the containers per se are intended to be disposed of after use, but the basket and frame assembly is re-usable with other similar containers purchased as "refills".

Other objects and advantages of the invention will become apparent from the detailed description which follows.

BRIEF DESCRIPTION OF THE DRAWINGS

FIG. 3 is a partial top view of the frame component illustrated in FIG. 1;

FIG. 4A is a cross section of the frame component taken along line 4A—4A of FIG. 4B;

FIG. 4B is a partial side view of one side portion of the frame component;

FIG. 5 is a side elevation of the basket component illustrated in FIG. 2, rotated 90°;

DETAILED DESCRIPTION OF THE DRAWINGS

Figure 1:
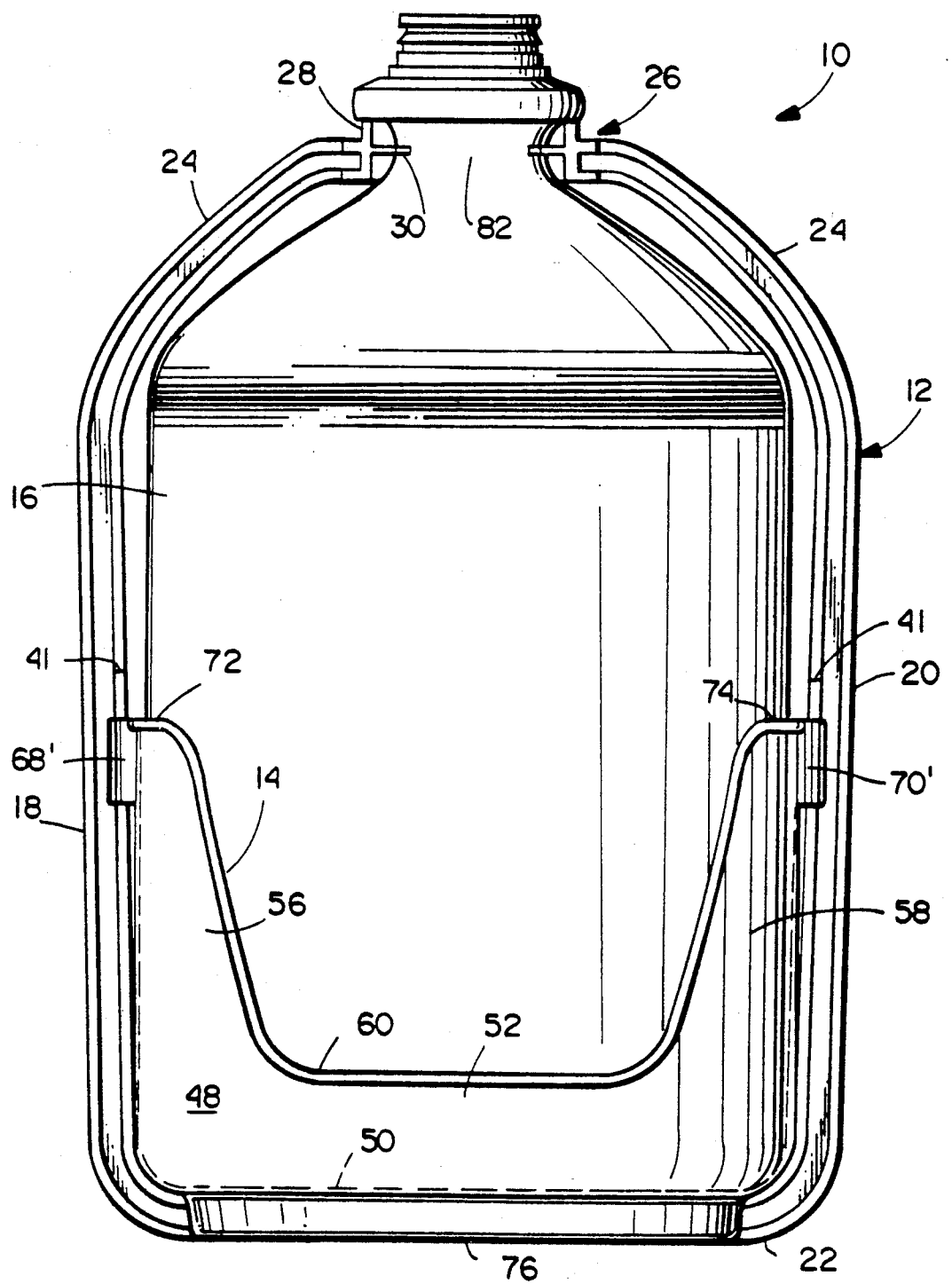
FIG. 1 is a side elevation of a basket and frame assembly in accordance with an exemplary embodiment of the invention, with an associated container inserted therein.
Figure 2:
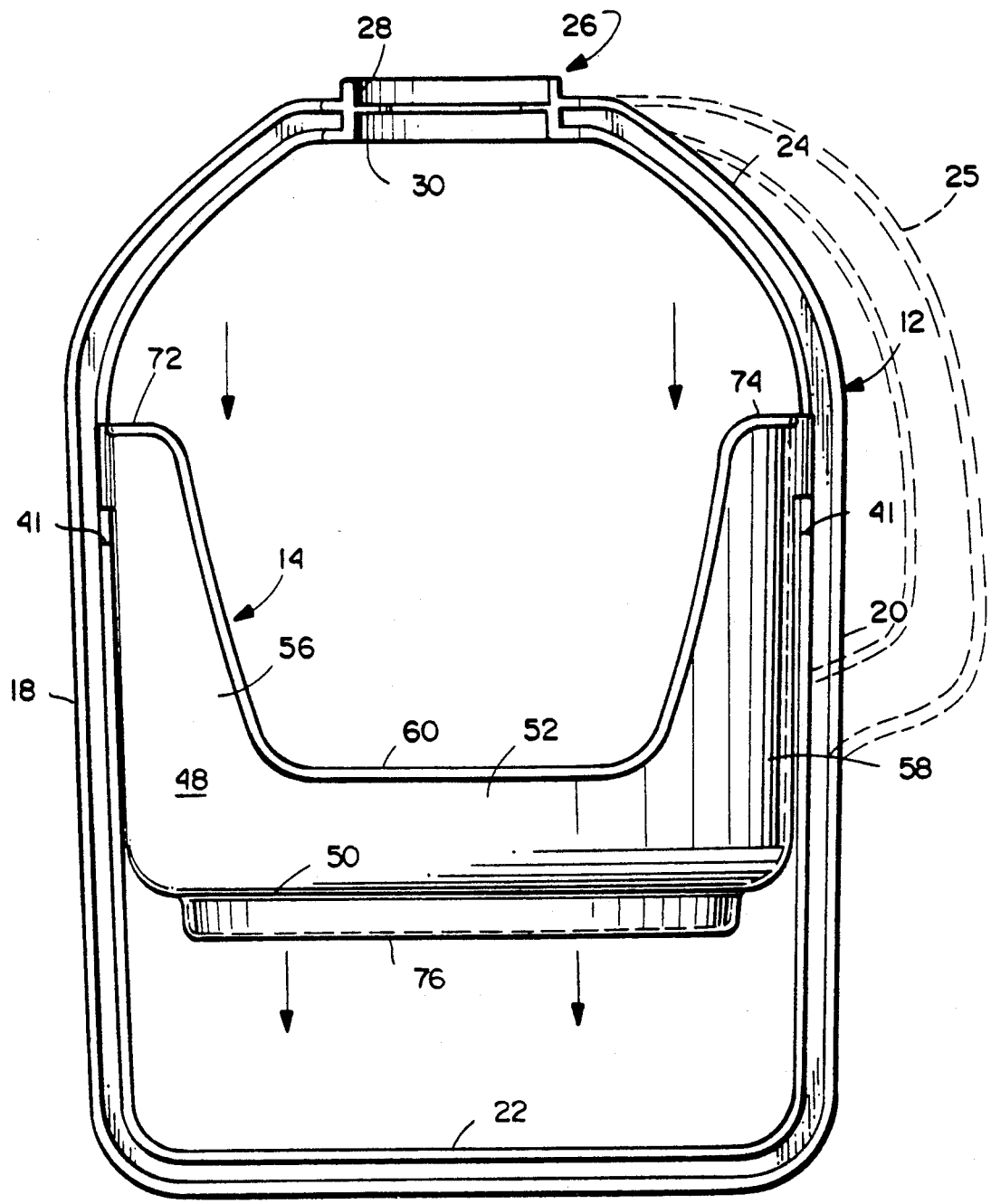
FIG. 2 is a side elevation of the basket and frame assembly of FIG. 1 with the container removed and with an optional handle added and illustrating the manner in which the basket is assembled with the frame.

With reference to FIGS. 1 and 2, an assembled container and supporting frame and basket assembly is shown at 10 and includes a frame member or component 12, a basket component 14, and a thin walled container 16 separably held therein. The frame component 12 is a one-piece, relatively rigid plastic member which includes relatively narrow side portions 18, 20, integrally connected by a bottom portion 22. Upper areas of the frame side portions 18, 20 are tapered upwardly as at 24 to a container neck supporting portion 26. The neck supporting portion 26 is substantially U-shaped in plan so as to permit sideward movement of the container neck into frictional engagement therewith.

The neck engaging portion 26 includes a substantially vertical U-shaped wall 28, the interior surface of which is formed with a horizontal rib or flange 30. As best seen in FIG. 3, the horizontal rib or flange 30 has a first arcuate portion 32 which corresponds substantially to an adjacent radius of curvature of the container neck. At opposite ends of the arcuate portion 32, there are outwardly flared edges 34, 36 which serve as guide edges during movement of the container neck into the opening 37 in the container neck engaging portion 26 of the frame 12.

In a preferred arrangement, the arcuate portion of the horizontal rib extends circumferentially greater than 180° so that the container neck may be snapped or pushed into place, and releasably held within the container neck engaging portion.

With reference now to FIGS. 4A and 4B, the frame component 12 throughout side and bottom portions 18, 20 and 22 is formed with a substantially I-shaped cross section including flanges 38, 40 interconnected by a web 42. The inner flange 40 (the flange facing inwardly towards the container) is formed of a slightly lesser width than the outer flange 38. The inner flange 40 increases in width at a pair of shoulders 41 located approximately midway along the side portions 18, 20. As a result, the assembly of the basket component 14 within the frame component 12 is facilitated, as explained in greater detail below.

It will be noted that the side portions 18, 20 and tapered portions 24 of the frame component are symmetrical to each other and to the container 16. The thin walled container construction and resultant flexible, collapsible container wall nevertheless permit easy grasping of the frame component in the area where, for example, tapered portion 24 merges with side extension 20. This arrangement permits easy storage of the assembly within a refrigerator or the like, without having to provide space for an otherwise protruding handle.

Nevertheless, as shown in FIG. 2, an asymmetrical handle portion 25 may be integrally formed as part of the frame component to permit even greater ease in grasping the basket and frame assembly. When such a handle is provided, the shoulder 41 on side portion 20 will, of course, be moved downwardly to a location where the handle 25 merges with side portion 20.

The basket component 14 as shown is circular in plan, although other shapes (square, rectangular, etc.) are possible, depending on the shape of the container per se.

The basket component 14 in the exemplary embodiment is a cup-like, generally cylindrical member which includes a peripheral side wall 48 and a bottom wall 50. The side wall includes diametrically opposed lower portions 52, 54 and upstanding portions 56, 58. The lower portions 52, 54 terminate at edges 60, 62 which are spaced sufficiently vertically above the bottom wall 50 to provide some degree of lateral support for the container 16. At the same time, however these lower portions 52, 54 provide open areas which facilitate the loading of a container 16 into the basket, particularly when the basket component 14 is assembled with the frame component 12.

Figure 6:
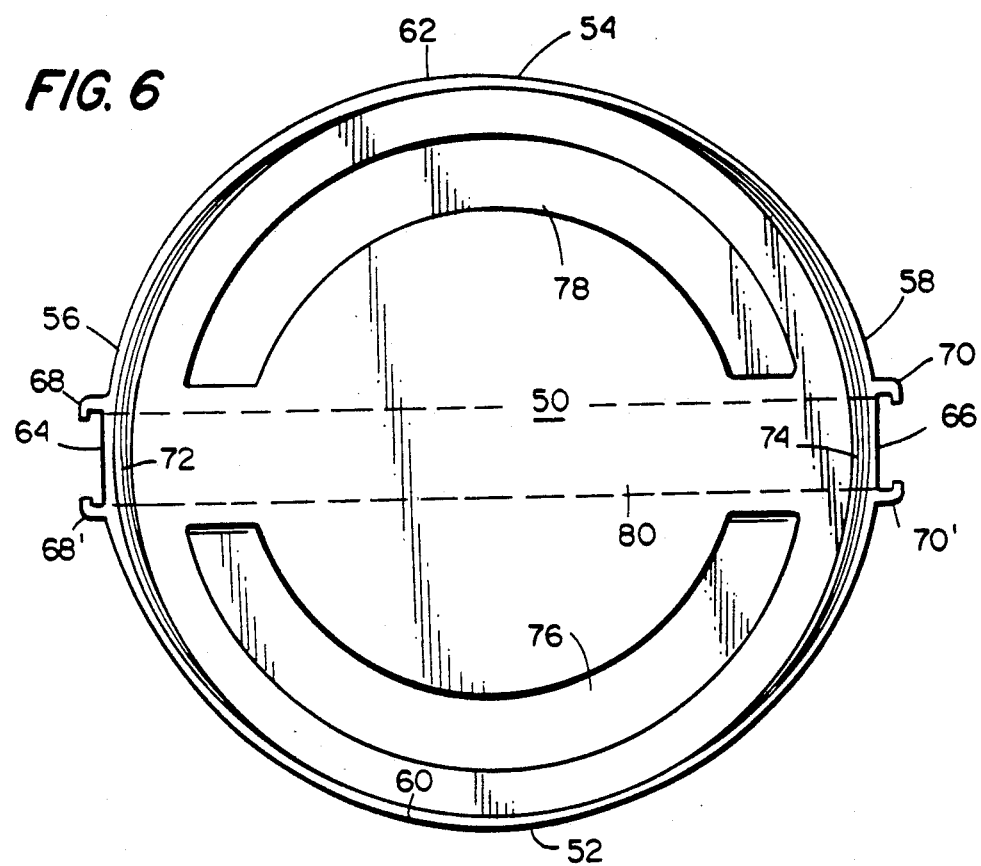
FIG. 6 is a top plan view of the basket component illustrated in FIG. 5.

With additional reference to FIGS. 5 and 6, radially outwardly facing grooves 64, 66, each of which is defined by a pair of ears which comprise substantially L-shaped projections 68, 68', 70 and 70', respectively, are formed in the upstanding portions 56, 58. These grooves are preferably located immediately adjacent upper edges 72, 74 of the upstanding portions 56, 58, respectively, but could be located in spaced relationship to such edges. Grooves 64, 66 are designed to receive flanges 40 of the frame side portions 18, 20, below shoulders 41, as described further below.

Within the bottom wall 50, there are a pair of downwardly projecting, arcuate leg portions 76, 78, each of which extends about 160° in arcuate length. As best seen in FIG. 6, these leg portions 76, 78 establish a centrally located recessed portion 80 which receives the bottom portion 22 of the frame, as shown in phantom in the FIG. The downward extent of the legs 76, 78 is such that the bottom portion 22 of the frame component 12 will not protrude beyond the supporting legs when the basket component 14 is fully seated on the frame (see FIG. 1). This arrangement preserves the stability of the assembly. Legs 76, 78 may be undercut at 81, 83 (as well as at the opposite ends of each leg—not shown) so that bottom portion 22 may snap into and be separably retained by the recessed portion 80. This feature may also be incorporated into the alternative embodiments described below.

In use, the basket component 14 can be assembled within the frame component 12 by locating the flanges 40 of the side portions 18, 20 within the grooves 64, 66 as shown in FIG. 2. This can be achieved by initially locating the basket in the upper portion of the frame component, above the shoulders 41. The basket component may then be moved downwardly so that the side extensions below shoulders 41 are slidably received within the grooves 64, 66. Downward movement of the component continues until the basket is seated on the bottom portion 22 of the frame component. A filled container 16 can then be inserted into the basket component 14 by tilting it to one side and slipping the bottom of the container into the basket 14, and then rotating the neck area 82 of the container into engagement within the neck engaging portion 26 of the frame component 12 via the opening 37.

By reversing the above described manipulations, an empty container 16 may be removed from the basket and frame assembly, and later replaced with a container refill.

Figure 7:
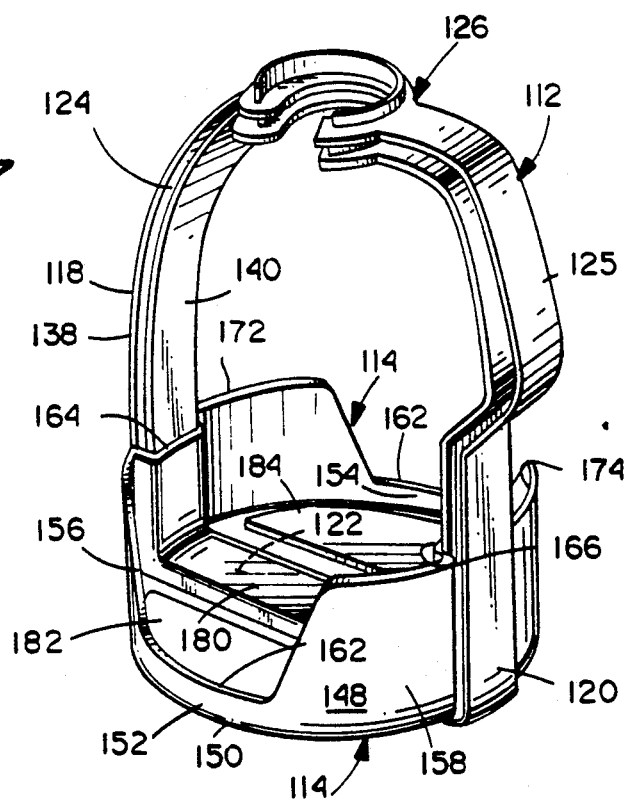
FIG. 7 is a perspective view of a basket and frame assembly in accordance with another exemplary embodiment of the invention.

Referring now to FIG. 7, another exemplary embodiment of the invention is illustrated where reference numerals similar to those used in the previously described embodiments are employed, but with the prefix "1" added. Thus, a frame component 112 and basket component 114 are provided for interfitting relationship. The frame component includes side extensions 1-18 and-.120 which are connected by a bottom portion 122. The upper portion of the one side extension 118 is provided with a tapered portion 124 leading to a container neck engaging portion 126. The side extension 120 is formed asymmetrically relative to the side extension 118 via the incorporation of an integral handle portion 125. The width of the frame component 112 is slightly greater than the earlier described embodiment but otherwise has a similar I-beam like cross-section. It will be appreciated that the width of the frame component may vary depending on the size of the container, strength requirements, and so on. It will further be appreciated that the construction of the neck engaging portion 126 is otherwise identical to the neck engaging portion 26 of the earlier described embodiment.

The basket component 114 also comprises a cup-like, generally cylindrical member which includes a peripheral side wall 148 and a bottom wall 150. The side wall 148 includes diametrically opposed lower portions 152, 154 and diametrically opposed upstanding portions 156, 158. The lower portions 152, 154 terminate at edges 160, 162 which are spaced slightly above the bottom wall 150 but nevertheless provide some degree of lateral support for the container.

In the upstanding portions 156, 158, there are provided radially outwardly facing grooves 164, 166 which extend vertically the full length of the upstanding portions 156, 158 and which merge in an unbroken manner with groove 180 across the bottom wall 150. Groove 180 may be formed with an undercut (not shown) which functions in the same manner as undercuts 81, 83 described above. The bottom wall 150 is also provided with upwardly projecting support pads 182, 184 which are substantially flush with the interior surface of the groove 180 to thereby provide a stable support base for the container. At the same time, by recessing the groove 180, when the basket component 114 is fully seated on the bottom portion 122 of the frame component 112, the bottom wall 150 of the basket component 114 rests on a supporting surface such as a table top or the like without interference from the bottom portion 122 of the frame component 112.

In assembling the basket component 114 and the frame component 112, the basket component 114 may be located in the upper portion of the closed loop frame component 112, adjacent the handle portion 125 and then moved downwardly so that the side extensions 118 and 120 are fully seated within the grooves 164, 166. This movement is continued until the basket component is fully seated on a bottom 122 of the frame component. Alternatively, the inherent flexibility of the frame and basket components 112, 114 will permit the frame component to be snapped or flexed into assembled relationship with the basket component.

Figure 8:
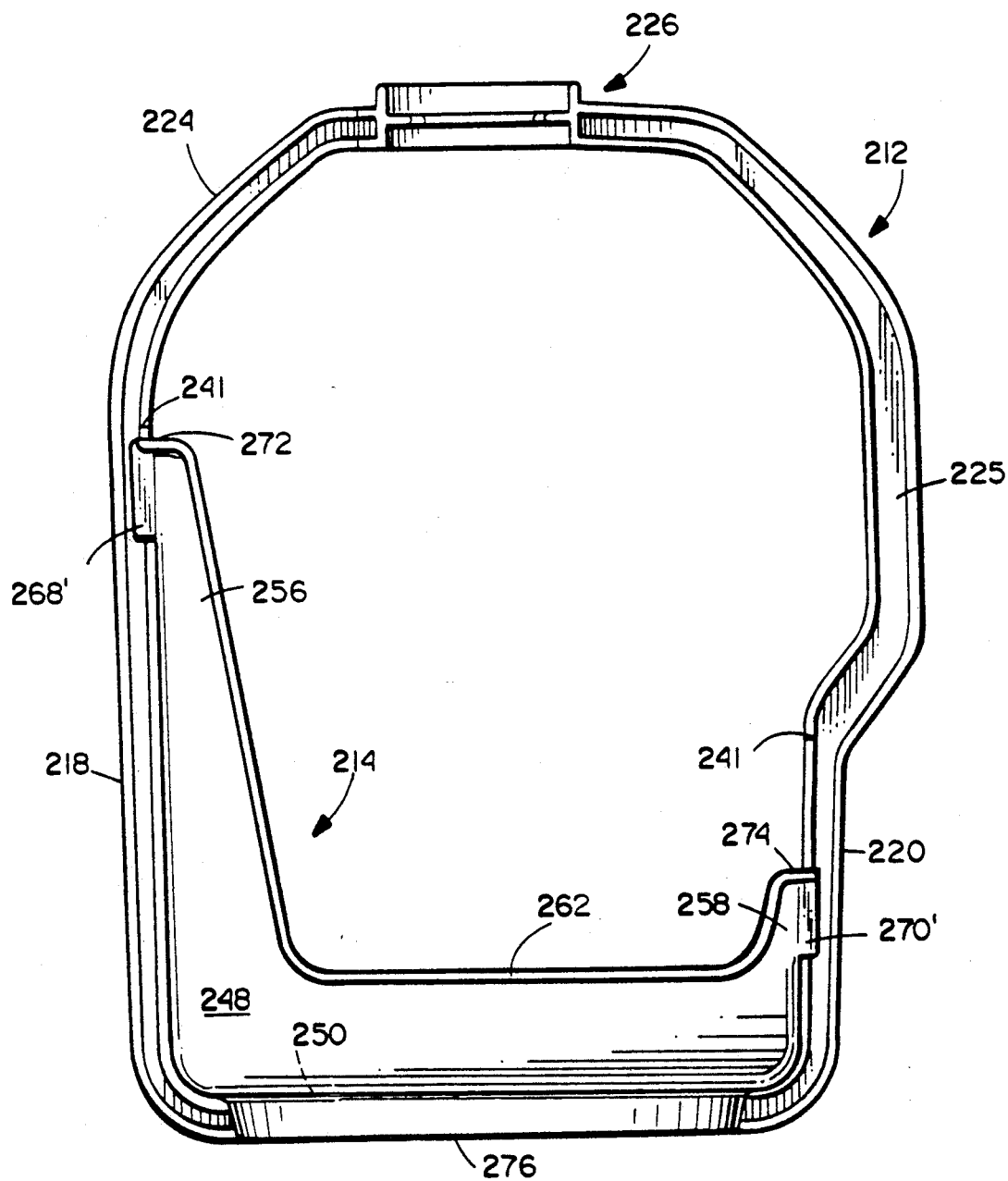
FIG. 8 is a side elevation of a basket and frame assembly in accordance with still another exemplary embodiment of the invention.

Referring now to FIG. 8, still another exemplary embodiment of the invention is illustrated and for convenience, reference numerals similar to those utilized in the two earlier described embodiments are employed, but with the prefix "2" added. The embodiment illustrated in FIG. 8 is similar to that illustrated in FIGS. 1 and 2 with two significant exceptions. The frame component 212 in FIG. 8 includes an integrally formed handle portion 225 to further facilitate the grasping of the frame component and the basket component, particularly when the container is in place. The second major difference lies in the basket component 214 wherein one of the upstanding portions of the basket component, i.e., 256, extends upwardly beyond the midway point of the side extension 218. At the same time, the other upstanding portion 258 extends upwardly to a height well below the midway point. In fact, in the exemplary embodiment shown, the upstanding portion 256 extends above the midway point a distance approximately equal to the distance between the midway point to the upper edge 274 of the upstanding portion 258. As a result of the differential heights of the respective upstanding portion 256, 258, a similar height differential exists with respect to the location of the shoulders 241 on the interior flanges 240 of the frame component 212.

The above described exemplary embodiment may be assembled in the same manner as described hereinabove with respect to the embodiments illustrated in FIGS. 1 and 2 but provides even greater ease of assembly not only with respect to the frame and basket components but also with respect to the installation of the container with..:n the basket frame assembly.

It will be understood that a number of different cooperating surface arrangements may be provided to hold the basket component in assembled relationship with the frame component and that the embodiments described hereinabove are merely exemplary.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A carrier assembly for supporting a container comprising:
   a closed loop frame component having an upper container neck engaging portion, a pair of opposed side portions and a bottom portion connecting the opposed side portions; and an open-ended basket component supportable within said closed-loop frame component and having a peripheral side wall extending upwardly from a bottom wall, said basket component dimensioned to receive at least a portion of a container therein, said bottom portion of said frame component extending across said bottom wall of said basket component.

2. The carrier assembly of claim 1 wherein said bottom wall of said basket component is provided with a pair of projecting supporting legs which form a recessed portion therebetween, said bottom portion of said frame component being dimensioned to be receivable in said recessed portion so that said bottom portion of said frame component does not extend downwardly beyond said supporting legs.

3. The carrier assembly of claim 1 wherein the container neck engaging portion of the frame component is substantially U-shaped in plan and comprises at least open substantially horizontally extending rib dimensioned to frictionally engage a neck portion of an associated container.

4. The carrier assembly of claim 3 wherein said rib includes a first portion having a radius of curvature substantially equal to a corresponding radius of curvature of the container neck portion, and second portions extending from opposite ends of said first portion.

5. The carrier assembly of claim 4 wherein said first portion has an arcuate extent of greater than 180°.

6. The carrier assembly of claim 1 wherein said basket component is provided with a pair of grooves in diametrically opposed, upper end portions of said peripheral side wall, said grooves dimensioned to receive said side portions of said frame component to thereby facilitate assembly and retention of said basket component within said frame component.

7. The carrier assembly of claim 6 wherein said bottom wall of said basket component is provided with downwardly projecting supporting legs which form a recessed portion therebetween, said bottom portion of said frame component being dimensioned to be received in said recessed portion so that bottom portion of said frame component does not protrude below said supporting legs.

8. The carrier assembly of claim 7 wherein each of said supporting legs is substantially arcuate in shape.

9. A container support comprising:
   first means including a bottom wall and a peripheral side wall extending upwardly from said bottom wall to thereby form a substantially cup-shaped component for receiving and supporting a lower portion of a container; and
   second means for receiving and supporting at least an upper portion of the container, said second means including a closed loop frame; wherein said first and second means include cooperable surface means for separably receiving and retaining said first means within said closed loop frame.

10. The container support of claim 9 wherein said surface means includes flanges on opposed side portions of said frame receivable in grooves formed in diametrically opposed portions of said peripheral side wall.

11. The container support of claim 10 and wherein said surface means further includes a bottom portion of said frame receivable in a recessed portion of said bottom wall.

12. The container support of claim 9 wherein said bottom wall is provided with a pair of hollow arcuate projections providing supporting legs for said first means.

13. The container support of claim 12 wherein said cooperable surface means includes a recessed area formed between and defined by, said pair of hollow, arcuate projections, said recessed area adapted to receive a portion of said second means.

14. The container support of claim 9 said cooperable surface means includes a groove extending continuously along diametrically opposed portions of said peripheral side wall and across said bottom wall.

15. The container support of claim 9 wherein said closed loop frame has a substantially I-shaped cross section throughout a major portion of its length.

16. The container support of claim 9 wherein said second means supports said first means at two locations about said peripheral side wall and across said bottom wall.

17. The container support of claim 9 wherein said first and second means are constructed of plastic material.

18. A container support comprising:
    a substantially cup-shaped portion having a peripheral side wall and a bottom wall, said peripheral side wall having a pair of diametrically opposed, radially outwardly facing grooves, said substantially cup-shaped portion dimensioned to removably receive a lower portion of a container; and a relatively rigid closed loop frame portion formed with a container neck-engaging portion, a pair of side portions and a bottom portion, wherein said side portions are formed with surface dimensioned to be receivable within said diametrically opposed grooves.

19. The container support, of claim 18 wherein said bottom wall of said cup-shaped portion is provided with a recessed area dimensioned for receiving said bottom portion of said closed loop frame portion, said area defined in part by a pair of supporting legs whereby said bottom portion does not protrude beyond lower edges of said supporting legs.

20. The container support of claim 18 wherein said bottom wall of said cup-shaped portion is provided with a groove connecting said radially outwardly facing grooves to thereby form a substantially U-shaped groove dimensioned for receiving said side portions and said bottom portion of said closed loop frame portion.

21. The container support of claim 18 wherein said peripheral side wall includes a pair of diametrically opposed upstanding portions, and wherein said radially outwardly facing grooves are located adjacent upper edges, respectively, of said opposed upstanding portions.

22. The container support of claim 18 in combination with a thin walled flexible container seated in said cup-shaped portion with a neck engaged by said neck engaging portion.

23. A carrier assembly for supporting a container comprising:
    a closed loop frame component having an upper container neck engaging portion, a pair of opposed side portions and a bottom portion connecting the opposed side portions; and a basket component supportable within said closed-loop frame component and having a peripheral side wall and a bottom wall, said basket component adapted to receive and support at least a lower portion of a container, said bottom portion of said frame component extending across said bottom wall of said basket component, wherein said frame component is substantially I-shaped in cross section in at least said side portions.

24. A carrier assembly for supporting a container comprising:

a closed loop frame component having an upper container neck engaging portion, a pair of opposed side portions and a bottom portion connecting the opposed side portions; and a basket component supportable within said closed-loop frame component and having a peripheral side wall and a bottom wall, said basket component adapted to receive and support at least a lower portion of a container, said bottom portion of said frame component extending across said bottom wall of said basket component, and wherein said frame component incorporates an asymmetrical handle portion.

25. A container support comprising:

first substantially cup-shaped means for receiving and supporting a lower portion of a container; and second means for receiving and supporting at least an upper portion of the container, said second means including a closed loop frame; wherein said first and second means include cooperable surface means for separably receiving and retaining said first means within said closed loop frame.

26. A container support comprising:

first means for receiving and supporting a lower portion of a container, said first means including a peripheral side wall and a bottom wall, said bottom wall having a pair of hollow arcuate projections providing support legs for said first means; and second means for receiving and supporting at least an upper portion of the container, said second means including a closed loop frame; wherein said first and second means include cooperable surface means for separably receiving and retaining said first means within said closed loop frame.

27. A container support comprising:

first means for receiving and supporting a lower portion of a container, said first means including a cup-shaped member having a peripheral side wall and a bottom wall; and second means for receiving and supporting at least an upper portion of the container, said second means including a closed loop frame; wherein said first and second means include cooperable surface means for separably receiving and retaining said first means within said closed loop frame, said cooperable surface means including a groove extending continuously along diametrically opposed portions of said side wall and across said bottom wall.

28. A container support comprising:

first means for receiving and supporting a lower portion of a container; and second means for receiving and supporting at least an upper portion of the container, said second means including a closed loop frame, wherein said first and second means include cooperable surface means for separably receiving and retaining said first means within said closed loop frame, and further wherein said closed loop frame has a substantially I-shaped cross section throughout a major portion of its length.

29. A container support comprising:

first means for receiving and supporting a lower portion of a container, said first means including a cup having a peripheral sidewall and a bottom wall; and second means for receiving and supporting at least an upper portion of the container, said second means including a closed loop frame; wherein said first and second means include cooperable surface means for separably receiving and retaining said first means within said closed loop frame, and further wherein said second means supports said first means at two locations about said peripheral side wall and across said bottom wall.

* * * * *